US007797368B1

(12) United States Patent
Gadkari

(10) Patent No.: US 7,797,368 B1
(45) Date of Patent: Sep. 14, 2010

(54) MANAGING A NETWORK OF CONSUMER-USE COMPUTING DEVICES

(75) Inventor: Sanjay S. Gadkari, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2274 days.

(21) Appl. No.: 09/715,752

(22) Filed: Nov. 17, 2000

(51) Int. Cl.
*G06F 15/16* (2006.01)

(52) U.S. Cl. ............... 709/201; 709/248; 709/217; 709/224

(58) Field of Classification Search ............ 709/100, 709/102, 105, 201, 248, 217, 224
See application file for complete search history.

(56) References Cited

U.S. PATENT DOCUMENTS

| | | | | |
|---|---|---|---|---|
| 5,291,594 | A * | 3/1994 | Sekiguchi et al. | 707/201 |
| 5,715,457 | A * | 2/1998 | Wakatani | 718/105 |
| 5,832,496 | A * | 11/1998 | Anand et al. | 707/102 |
| 6,041,342 | A * | 3/2000 | Yamaguchi | 709/202 |
| 6,098,091 | A * | 8/2000 | Kisor | 709/202 |
| 6,112,225 | A * | 8/2000 | Kraft et al. | 709/202 |
| 6,192,388 | B1 * | 2/2001 | Cajolet | 718/100 |
| 6,275,987 | B1 * | 8/2001 | Fraley et al. | 717/127 |
| 6,470,375 | B1 * | 10/2002 | Whitner et al. | 718/105 |
| 6,480,896 | B1 * | 11/2002 | Brown et al. | 709/231 |
| 6,604,160 | B1 * | 8/2003 | Le et al. | 710/240 |
| 6,618,742 | B1 * | 9/2003 | Krum | 718/100 |
| 6,636,983 | B1 * | 10/2003 | Levi | 714/4 |
| 6,647,393 | B1 * | 11/2003 | Dietterich et al. | 707/102 |
| 6,647,448 | B1 * | 11/2003 | Brelin | 710/107 |
| 6,678,716 | B1 * | 1/2004 | Pronsati et al. | 709/201 |
| 6,691,067 | B1 * | 2/2004 | Ding et al. | 702/186 |
| 6,694,345 | B1 * | 2/2004 | Brelsford et al. | 718/100 |
| 2002/0122077 | A1 * | 9/2002 | Doney et al. | 345/853 |
| 2002/0124041 | A1 * | 9/2002 | Zack et al. | 709/102 |

FOREIGN PATENT DOCUMENTS

CA      2315446 A1 *  4/2001

OTHER PUBLICATIONS

"Control and Management in a Mobile Agent Workflow Architecture", Foster et al.*

* cited by examiner

*Primary Examiner*—Thu Nguyen
*Assistant Examiner*—Lan-Dai T Truong
(74) *Attorney, Agent, or Firm*—Trop, Pruner & Hu, P.C.

(57) ABSTRACT

A managed system of consumer-use processor-based devices may be utilized to reliably complete distributed computing jobs with predictable latency and throughput. Distributed computing jobs may be divided into tasks and distributed to a managed network of consumer-use processor-based devices. In some cases, the nature and characteristics of each of those devices as well as their available resources may be well known to a system service provider or server. Thus, the capability of the network of processor-based devices may be reliably predicted. Particularly where all the devices are maintained remotely from a server, the managed network of processor-based devices may be depended upon to more reliably execute distributed processing tasks assigned by the server.

23 Claims, 4 Drawing Sheets large number of clients 16 over a
MANAGING A NETWORK OF CONSUMER-USE COMPUTING DEVICES

BACKGROUND

This invention relates generally to processor-based systems and particular to networks of processor-based systems used by consumers.

Managed networks of consumer-use computing devices enable consumers to off load the management of their home processor-based system to a remote service provider. The service provider may remotely maintain the system resident in the user's home. Remote diagnostic devices may be utilized to analyze any software or hardware problems as they arise on the home-based system. A remote server may monitor each home-based processor-based system for alerts. In addition, the remote server may provide software upgrades for those systems.

Ideally, the remote server works seamlessly with each home-based processor-based system in the network since the nature of each home-based processor-based system may be specified by the service provider. Alternatively, a network service provider may provide the software and hardware that make up each of the home-based processor-based systems in the network.

For example, each of the home-based processor-based systems may be persistently connected to the server. In one example, the server may be a simple message system (SMS) server. The server, in persistent communication with each of the home-based processor-based systems, knows what each processor-based system is doing at any time. The persistent connection may be maintained using a predetermined address and port.

The service provider may provide television-related data services, shopping, banking or other services. Thus, the consumer may use the processor-based system to receive a range of services that may be facilitated through software provided by the service provider. The processor-based system may be a desktop computer, a set-top box, or a processor-based appliance, as a few examples.

The success of the service provider may be dependent, in part, on providing the greatest possible value to each network user. This may enable the service provider to provide its services at the lowest possible cost.

Thus, there is a need for better ways to obtain the greatest possible value from networks of managed consumer-use computing devices.

DETAILED DESCRIPTION

Figure 1:
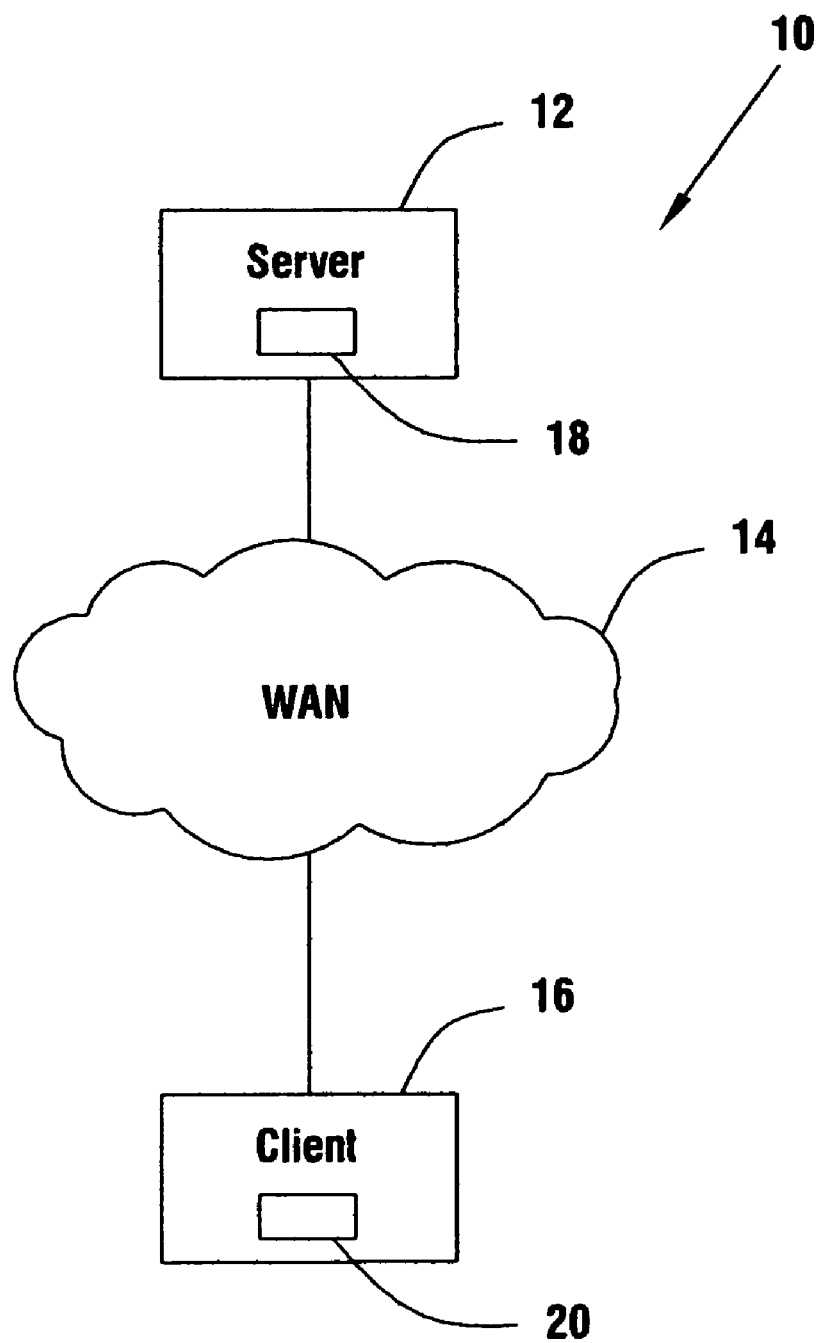
FIG. 1 is a schematic depiction of one embodiment of the present invention.
Figure 2A:
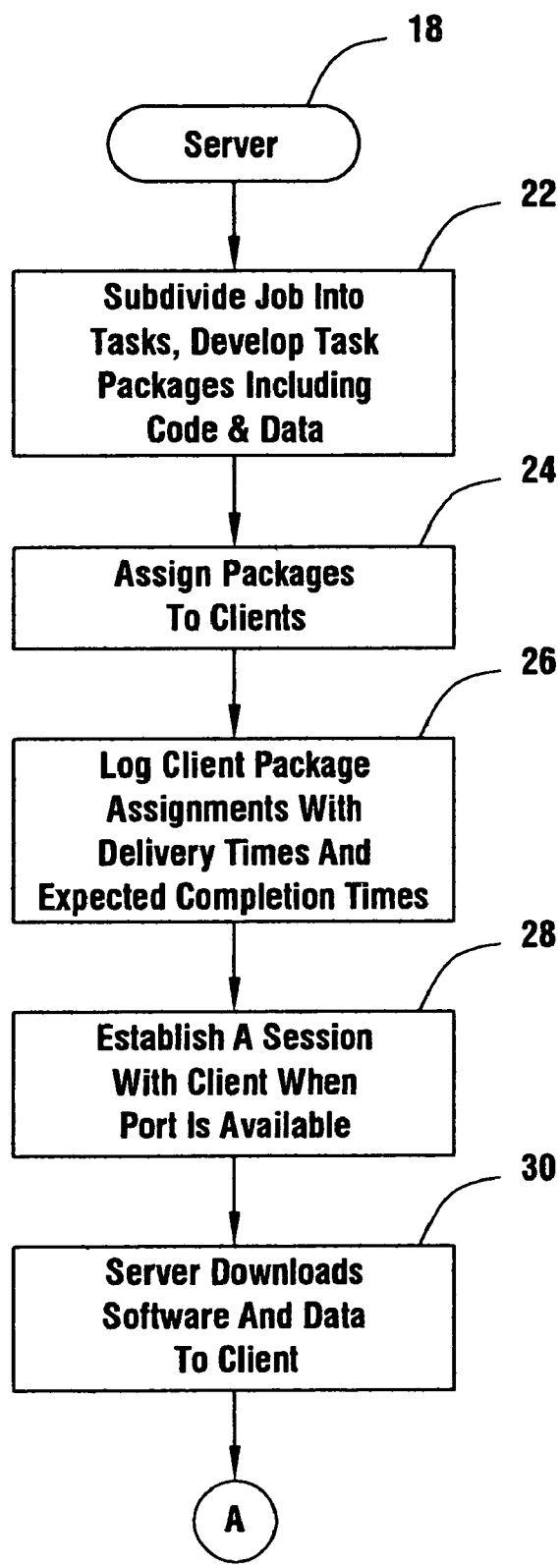
FIG. 2A is a flow chart for software for operating a server in accordance with one embodiment of the present invention.
Figure 2B:
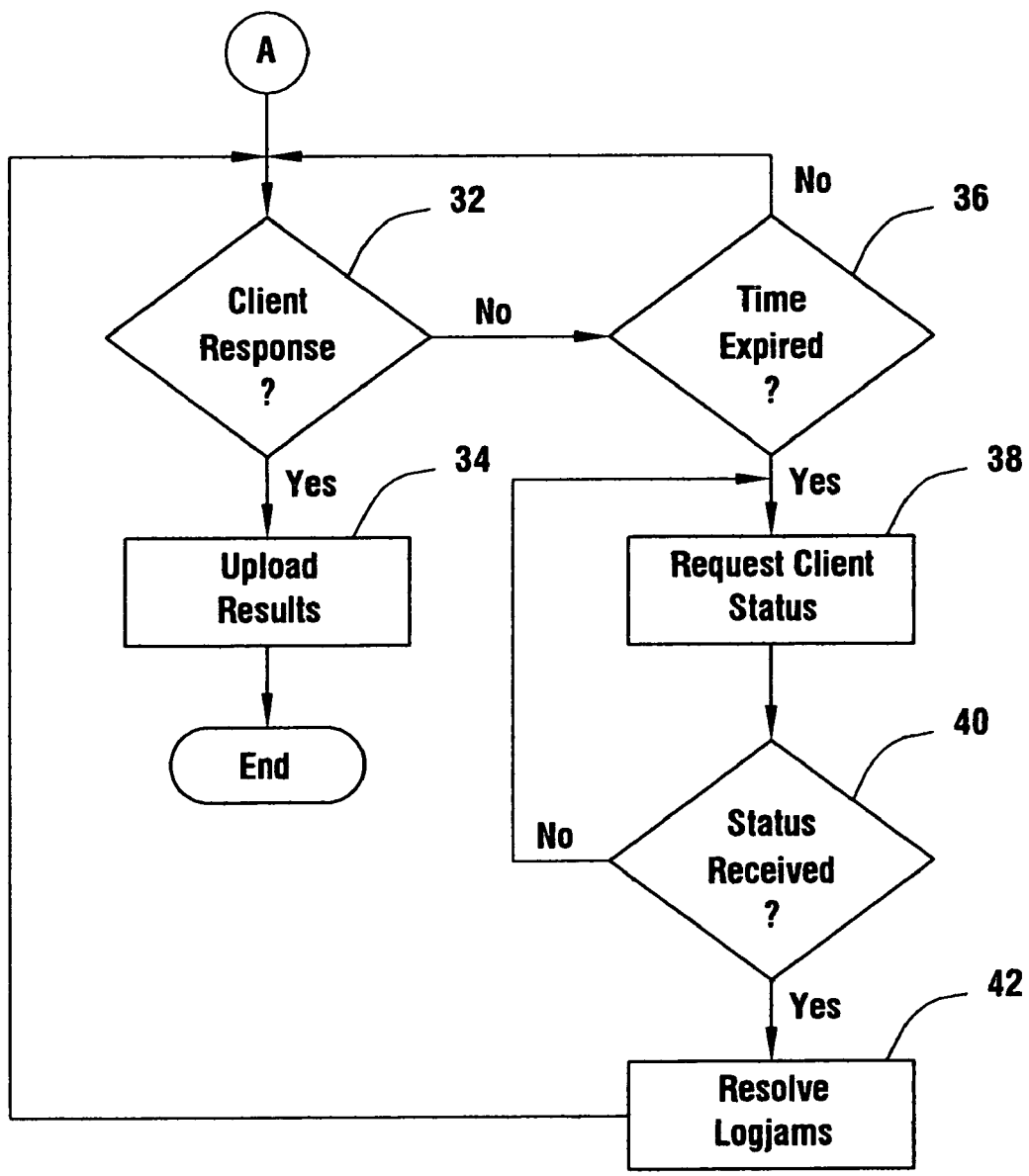
FIG. 2B is a continuation of the flow chart shown in FIG. 2A.

Referring to FIG. 1, a managed network 10 of consumer-use computing devices or clients 16 may provide a on-demand or persistent connection between each client 16 (only one of which is shown in FIG. 1) and a server 12. In one embodiment of the present invention, the server 12 manages the operations on each of a large number of clients 16 over a network 14 such as wide area network, local area network, a metropolitan area network or the Internet as examples. In one embodiment, the server 12 may be a system management server (SMS).

As one example, the server 12 may communicate over a predetermined, persistent connection with each client 16. For example, a predetermined address and port may be utilized to facilitate two-way communications between each client 16 and the server 12. The persistent connection may be a cable or telephone connection such as a digital subscriber link (DSL).

The server 12 may monitor all operations which occur on each client 16. Thus, the server 12 may know at any instance of time what the client 16 is working on. In addition, the server 12 monitors the health of each client 16 and watches for alerts from each client 16.

In some embodiments of the present invention, the hardware and software available on the client 16 are known to the server 12. For example, in one embodiment, the client 16 hardware and software may be provided by a service provider that manages the network 10. Thus, the service provider knows how the client 16 may operate and may even provide additional hardware and software related services such as software upgrades. In addition, if a software or hardware problem occurs on the client 16, remote diagnostic systems may be utilized by the server 12 to resolve those client 16 problems remotely from the server 12.

As a result, the server 12 may determine the available computing resources of the network 10. That is, at any given time and over any given period, the server 12 can determine the available computing resources in the network 10 because the server 12 knows the client's capacity and average computing load, including memory, network, processor and disk utilization. Since the activity on the client 16 may be affected asynchronously by operations initiated by the user of the client 16, the server 12 can develop models that indicate, for given times of day and given days of the week, the available resources in the network 10. The models may be developed from a history of computing load. In this way, the server 12 software can dynamically predict at any given time or over any given time period, what distributed computing jobs may be completed by idle network resource made up of all the unused resources of all the clients 16 in the network 10. Moreover, in some embodiments the server 12 has complete control over the client 10 including the ability to prevent the user from interfering with any distributed computing tasks assigned to the client 16.

As a result, a service provider that operates the network 10 may offer for sale to third parties, the use of any unused distributed computing resources of the network 10. The third party's software and data may be downloaded from the server 12 to clients 16 to enable the clients 16 to complete all or part of a overall distributed processing job. The data may then be returned by the client 16 to the server 12 for assembly. The results from the client 16 computing resources may then be reported to the third party. This may all be done without significant disruption to the services provided by each client 16.

The server 12 may be a processor-based system that includes a storage that stores the software 18. Similarly, the client 16 may be a processor-based system such as a desktop computer, a set-top box, a processor-based appliance, as examples, including a storage that stores the software 20.

The server software 18, in accordance with one embodiment of the present invention, distributes third party processing jobs to the clients 16 in the network 10. Initially, the software 18 parses a processing job into tasks and develops task packages including code and data, as indicated in block 22. Thus, the server 12, in one embodiment, may take an overall computing job and may divide it into tasks that are amenable to being operated on at each client 16. An overall job may be divided into a number of tasks that are of sufficiently small size and require no more resources than those available on a given client 16.

Each task may then be provided as a package that may be communicated over an existing persistent communication link from the server 12 to each client 16 in one embodiment. Each package may be assigned to a particular client 16 as indicated in block 24. The client package assignments may then be logged on the server 12 with delivery times and expected completion times as indicated in block 26.

The server 12 keeps track of which package was sent to each client 16. The server 12 may do this by maintaining a list of packages and package identities together with a corresponding identifier for the client 16 that is receiving the package. Since the available resources on the client 16 are known, the server 12 can determine an expected task completion time. For example, the server 12 may utilize system-wide average idle cycle time information to determine an expected completion time of an assigned task by any given client 16. Alternatively, the server 12 can use statistics associated with each client 16 to determine the expected completion time.

In one embodiment of the present invention, the client 16 may execute the assigned task during idle cycles. Thus, the processing job may be completed by a plurality of clients 16 using otherwise unused cycles. These unused cycles may occur at night when the client 16 is not operating or in the day when the user happens not to be using the client 16. In a multitasking environment, the task may also be completed, in some cases, when the clients 16 are doing tasks for the user or owner of the client 16.

The server 12 may establish a session with each client 16 when an available port exists as indicated in block 28. The server 12 then downloads the software and the data making up the package to the client 16 as indicated in block 30.

The server 12 may await a response from the client 16, as indicated in diamond 32, in one embodiment. When the response is received, the server 12 uploads the results from a given client 16, as indicated in block 34.

A check at diamond 36 determines whether a predetermined time period has expired. If so, the server 12 may request client status information as indicated in block 38. In other words, the server 12 may attempt to determine why the client 16 has not completed the task within a predetermined amount of time. In one embodiment, the predetermined amount of time is that time that the server 12 predicted the client 16 would need to complete the assigned task. Thus, the server 12 may determine if a processing error of some type has occurred which has prevented the client 16 from completing the task.

In one embodiment, the server 12 automatically requests an upload after the passage of the expected time to complete the task. In other words, in this embodiment the upload is not triggered by a client 16 task completion indication.

When a status response is received, as determined in diamond 40, the server 12 may attempt to resolve any log jams as indicated in block 42. For example if a software or hardware crash has occurred, the server 12 may attempt to remotely diagnose and resolve the problem. The server 12 may determine that a software upgrade may be needed to complete the task as another example. The server 12 may also send a message to the owner or user of the client 16 requesting completion of certain operations to determine why the client 16 is not operating as expected.

Figure 3:
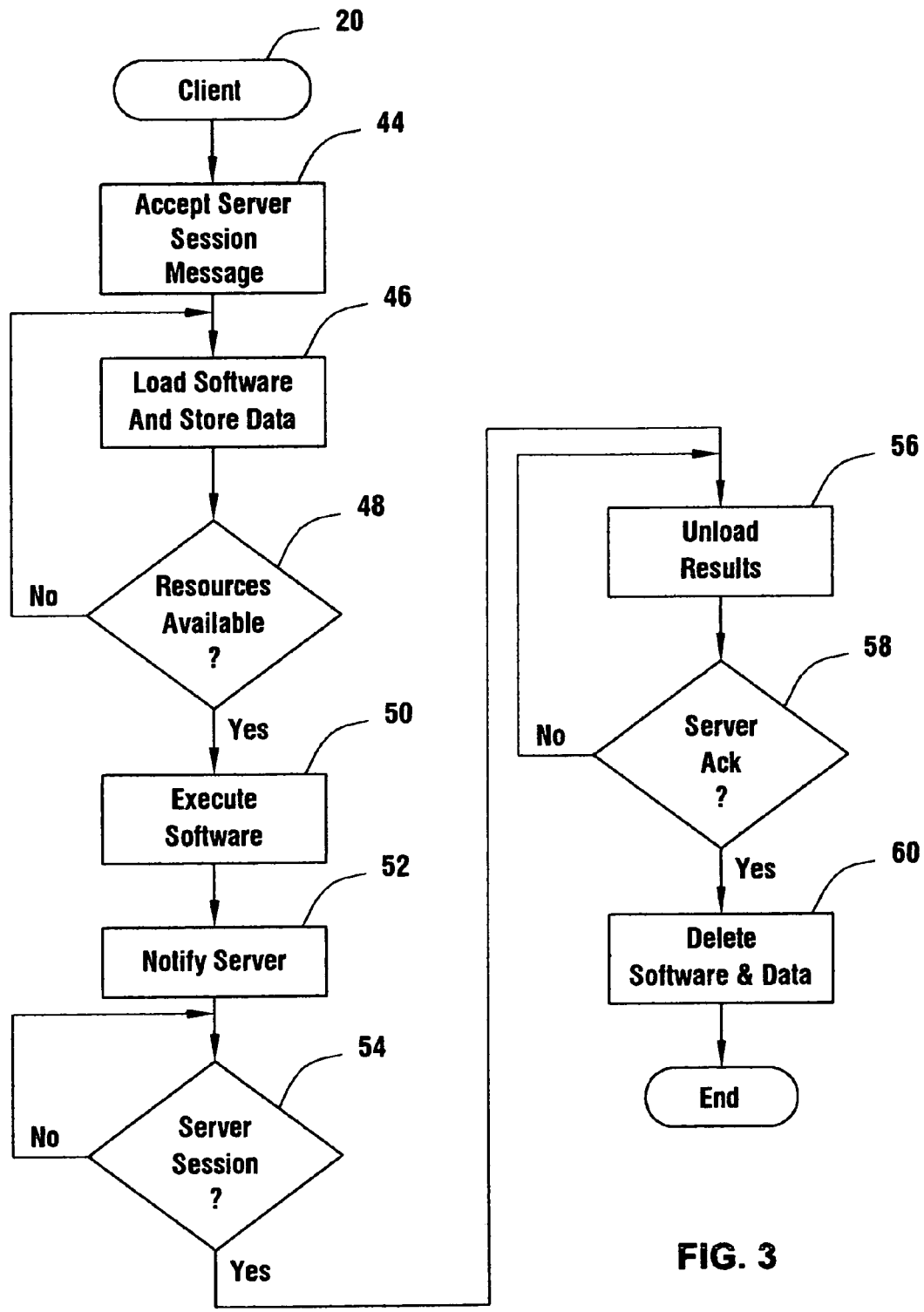
FIG. 3 is a flow chart for software stored on a client in accordance with one embodiment of the present invention.

Turning next to FIG. 3, the software 20 stored on each client 16, accepts the server session message, as indicated in block 44 in accordance with one embodiment of the present invention. The client 16 then loads the software and stores the data received from the server 12 in order to complete the assigned task, as indicated in block 46.

At diamond 48, a check determines whether the client 16 resources are currently available to complete the assigned task. For example, the software 20 can monitor ongoing operations to determine whether the client 16 is currently idle or has been idle for sufficient time to predict that the client 16 will remain idle for a sufficient time to complete the assigned task. In accordance with one embodiment of the present invention, the client 16 may be called upon to check the Advanced Configuration and Power Interface (ACPI) Specification power states to determine the operational state of the client 16. See ACPI Specification (Rev. 1.0, Dec. 22, 1996). Depending on the current power state, the client 16 may be directed to run the software and data received from the server 12, as indicated in block 50.

Once the execution of the assigned task is completed, the server 12 may be notified, as indicated in block 52. In one embodiment, the client 16 may send a message to the server 12 indicating that the client 16 has completed the assigned task.

A check at diamond 54 may determine whether a server session has been established between the client 16 and the server 12. In one embodiment of the present invention, the server 12 may initiate a session with the client 16 when sufficient server 12 resources are available. In another embodiment, the session may be initiated at a predefined time. For example, the server session may be initiated late at night when it is unlikely that a user will be using the client 16.

When the server session begins, as determined in diamond 54, the results obtained by the client 16 may be uploaded to the server 12, as indicated at block 56. The session may be maintained until the server 12 provides an acknowledgement that the results were correctly received. For example, a checksum may be provided with the uploaded results that enable the server 12 to ensure that the results have been uploaded correctly. When the client receives an acknowledgement from the server 12 that the results were received correctly, as determined in diamond 58, the client 16 may automatically delete the software and data that was downloaded earlier from the server 12, as indicated in block 60 in the embodiment. This ensures that client resources do not become unnecessarily taxed by indeterminately storing software and data that are of no use to the owner or user of the client 16.

In this way, in some embodiments of the present invention, a third party does not need to depend on a distributed computing arrangement in which the nature, characteristics and number of clients that will participate in a computing project is unknown. Instead, with the clients 16 managed by the server 12, the resources that may be applied to the project are known in advance. As a result, the third party may be given a realistic estimate of when the computing job may be completed. Moreover, because the nature of each client 16 is monitored by the server 12 and the server 12 ensures the health of those clients 16, a more reliable distributed computing arrangement may be achieved. In some cases, each client 16 may be pre-equipped with the software that facilitates the execution of idle cycle distributed computing jobs. Thus, the use of a managed network of consumer-use computing devices to complete distributed computing jobs may be advantageous.

Advantages from such an arrangement to the third party as well as those to the service provider are clear. Additionally, the owners or users of the clients 16 may enjoy reduced operating expenses in some cases. Cost reductions may arise because the proceeds from the sale of otherwise wasted resources may be passed, at least in part, to the consumers who use the clients 16.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    assigning, from a server, distributed computing tasks to a network of processor-based client devices;
    estimating, at said server, based on a client device's resources, a time when the client device is to complete an assigned task;
    determining, at the server, whether the task is completed after said time; and
    if not, determining, at the server, why the task was not completed.

2. The method of claim 1 including establishing a persistent connection between at least one of said devices and a server.

3. The method of claim 1 including subdividing a distributed computing job into tasks and assigning each of said tasks to a different device.

4. The method of claim 1 including, if no results are received after the passage of said time estimate, querying said device.

5. The method of claim 1 including automatically requesting results after the passage of said time estimate.

6. The method of claim 1 including maintaining, from a server, the software on said devices.

7. The method of claim 1 including receiving the results of said task from a device and providing an acknowledgement to said device when the results are received correctly.

8. The method of claim 1 including receiving a completion message from a device and automatically establishing an upload session to receive the task results.

9. An article comprising a medium storing instructions that, if executed, enable a server to:
    assign, from a server, distributed computing tasks to a plurality of processor-based client devices;
    estimate, at said server, based on a client device's resources, a time when the client device is to complete an assigned task;
    determine, at the server, whether the task is completed after said time; and
    if not, determine, at the server, why the task was not completed.

10. The article of claim 9 further storing instructions that enable the server to establish a persistent connection between at least one of said devices and said system.

11. The article of claim 9 further storing instructions that enable the server to subdivide a distributed computing job into tasks and assign each of said tasks to a different device.

12. The article of claim 9 further storing instructions that enable the server to query a device if no results are received after the passage of said time estimate.

13. The article of claim 9 further storing instructions that enable the server to automatically request results from said task after the passage of said time estimate.

14. The article of claim 9 further storing instructions that enable the server to maintain the software on a device.

15. The article of claim 9 further storing instructions that enable the server to receive the results of a task from a device and provide an acknowledgement to said device when the results are received correctly.

16. The article of claim 9 further storing instructions that enable the server to receive a completion message from a device and automatically establish an upload session to receive the task results.

17. A server comprising:
    a processor-based device; and
    a storage coupled to said processor-based device storing instructions that, if executed, enable said device to operate a managed network of consumer-use processor-based clients, assign, from a server, distributed computing tasks to said clients, estimate, at said server, based on a client device's resources, a time when the client device is to complete an assigned task, and determine, at the server, whether the task is completed after said time and, if not, determine, at the server, why the task was not completed.

18. The server of claim 17 wherein said server is a system management server.

19. The server of claim 17 wherein said processor-based device has a persistent connection with at least one consumer-use processor-based client.

20. The server of claim 17 wherein said storage stores instructions that enable said processor-based device to divide a distributed computing job into a plurality of tasks, assign said tasks to specific processor-based clients, and estimate the time to complete said job by said clients.

21. The server of claim 17 further storing instructions to develop an estimate of the time to task completion.

22. The server of claim 21 further storing instructions to automatically request said results after the passage of said time estimate.

23. The server of claim 17 further storing instructions that, if no results are received after the passage of said time estimate, querying said device.

* * * * *